(12) United States Patent
Whitefield et al.

(10) Patent No.: US 11,271,638 B2
(45) Date of Patent: *Mar. 8, 2022

(54) SATELLITE SYSTEM INCLUDING BACKHAUL CONNECTION OF DATA CENTERS TO GATEWAYS

(71) Applicant: Hughes Network Systems, LLC, Germantown, MD (US)

(72) Inventors: David Whitefield, Gaithersburg, MD (US); Gregory Marnte Presbury, Hyattsville, MD (US); Robert James Torres, New Market, MD (US); Nimesh Prakash Ambeskar, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/732,186

(22) Filed: Dec. 31, 2019

(65) Prior Publication Data

US 2021/0203412 A1    Jul. 1, 2021

(51) Int. Cl.
*H04B 7/185*    (2006.01)
*H04W 24/02*    (2009.01)

(52) U.S. Cl.
CPC .............................. *H04B 7/18519* (2013.01)

(58) Field of Classification Search
CPC ..... H04W 24/02; H04W 24/04; H04W 28/16; H04W 52/0203; H04W 84/00; H04W 84/06; H04W 92/12; H04B 7/185; H04B 7/1851; H04B 7/18513; H04B 7/18515; H04B 7/18517; H04B 7/18519; H04B 7/18521; H04B 7/18523; H04B 7/18526
USPC ...................................... 455/446, 12.1, 13.1
See application file for complete search history.

(56) References Cited

U.S. PATENT DOCUMENTS

2018/0351652 A1 * 12/2018 Ashrafi ................... H04L 41/08

* cited by examiner

*Primary Examiner* — Philip Sobutka
(74) *Attorney, Agent, or Firm* — NovoTechIP International PLLC

(57) ABSTRACT

A method of and system for designing a satellite network includes selecting an optimal design for a backhaul network to be used as part of the satellite network, selecting a number of radio frequency (RF) gateways for the satellite network, selecting an optimal number of satellite network cores (SNCs) for the satellite network. The method may also include placing each SNC at a site that is geographically separate from locations of the RF gateways, selecting a number of data centers for the satellite network, connecting each SNC to one or more data centers in the satellite network, and connecting each data center to one or more of the RF gateways via the backhaul network.

20 Claims, 8 Drawing Sheets

SATELLITE SYSTEM INCLUDING BACKHAUL CONNECTION OF DATA CENTERS TO GATEWAYS

TECHNICAL FIELD

This disclosure relates generally to an interconnected network design for a satellite system, and more particularly, to a method and system of designing an interconnected network for a high throughput satellite system.

BACKGROUND

In recent years, with the increased need for higher bandwidth and capacity, satellite systems have evolved from using low frequency bands such as the C-band to Ku-band and Ka-band. With the use of systems such as a very high throughput satellite (VHTS), the systems have further evolved to use higher frequency bands such as the Q-band and the V-band. Although these higher frequency bands may provide increased bandwidth and capacity, they introduce a set of unique challenges. For example, use of higher frequency bands may result in greater susceptibility to deep rain and rain fades in satellite communications.

Hence, there is a need for an improved design for an interconnected satellite system that uses high frequency bandwidths.

SUMMARY

To address these issues and more, in one general aspect, the instant application describes a method for designing a satellite network. The method may include selecting an optimal design for a backhaul network to be used as part of the satellite network, selecting a number of radio frequency (RF) gateways for the satellite network, selecting an optimal number of satellite network cores (SNCs) for the satellite network. The method may also include placing each SNC at a site that is geographically separate from locations of the RF gateways, selecting a number of data centers for the satellite network, connecting each SNC to one or more data centers in the satellite network, and connecting each data center to one or more of the RF gateways via the backhaul network.

In yet another general aspect, the instant application describes a regionalized satellite network system. The regionalized satellite network system may include a backhaul network, a plurality of RF gateways, one or more SNCs, and one or more data centers. Each of the one or more SNCs is located at a site that is geographically separate from locations of each of the plurality of the RF gateways, each of the one or more SNCs is connected to at least one of the one or more data centers, and each of the one or more data centers is connected to one or more of the plurality of RF gateways via the backhaul network.

In a further general aspect, the instant application describes a regionalized satellite network system. The regionalized satellite network system may include a backhaul network having an optimal network design, a plurality of RF gateways, a selected number of SNCs, one or more data centers, and an external network management system. Each of the SNCs is located at one of the one or more data centers, each of the one or more data centers is connected to one or more of the plurality of RF gateways via the backhaul network, and the external network management system is connected to at least one of the one or more of data centers via an external network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
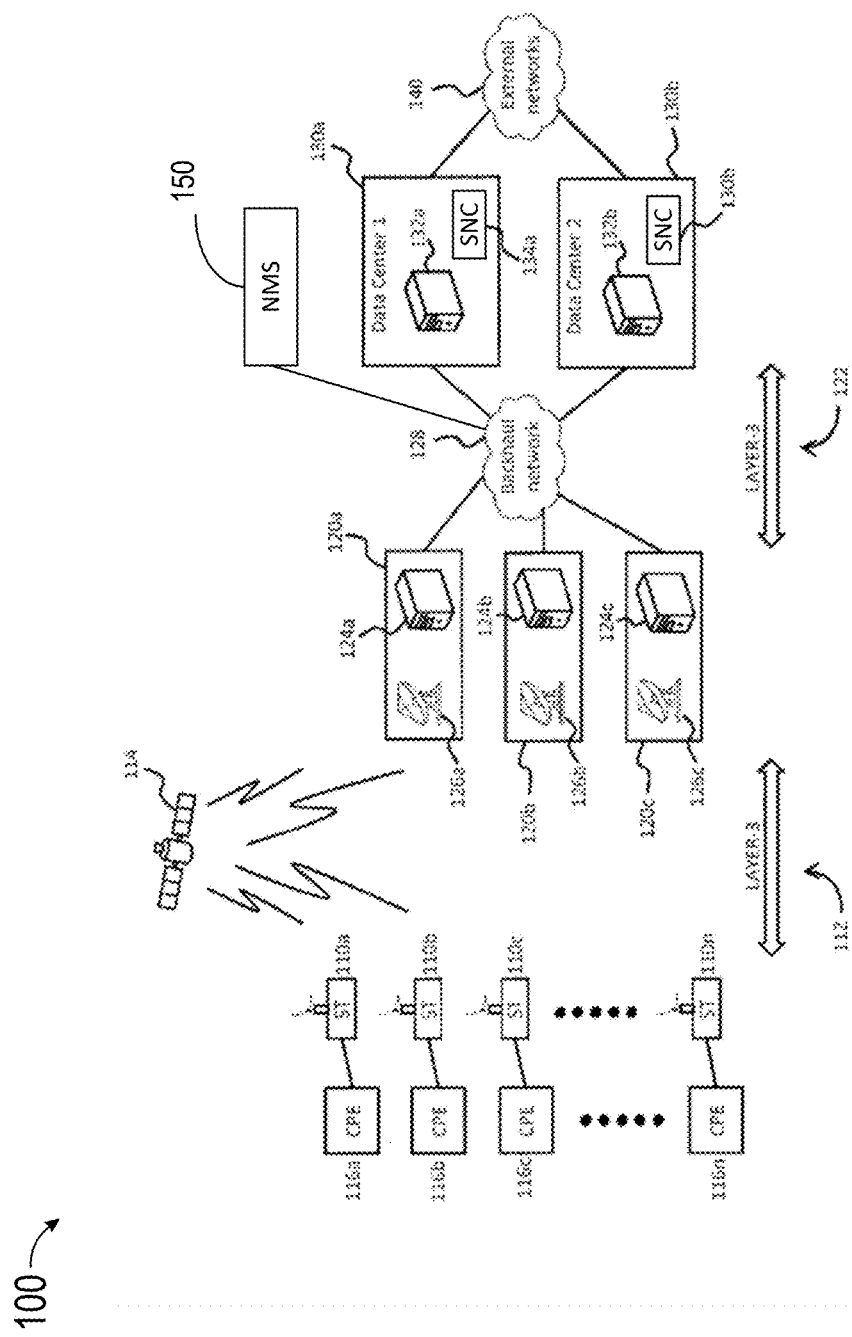
FIG. 1 depicts an example network design for a satellite system architecture upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

In recent years, as the use of higher frequency bands has increased in satellite systems, the circumstances that affect the operation of satellite network systems has changed. For example, high bandwidth frequencies may be more susceptible to rain and as such may be more affected by rain fade. Yet, existing mechanisms for designing satellite networks do not sufficiently address the challenges presented by rain fade in the higher frequencies. For example, when using higher bandwidth frequencies, rain may become an availability issue at RF gateways. As a result, providing satellite network designs that can be flexibly reconfigured when needed (e.g., in the presence of rain fade) and are able to handle rerouting of data may become more important when using higher bandwidth frequencies. Furthermore, ensuring availability of backhaul and/or internet links at RF gateway locations that require higher throughput may be a challenge, particularly in a centrally managed system. Additionally, the existing network design systems may not sufficiently address bandwidth management control or latency added to data traffic which is routed to regional data centers. As such, currently available solutions may not be effective in properly designing satellite network systems.

To address these technical problems and more, in an example, this description provides a technical solution for designing an interconnected satellite network system. To improve the design of satellite networks, the technical solution may utilize a mechanism for designing a regionalized network architecture that takes into account various parameters to determine the number of satellite data centers required and the most effective backhaul design for connecting the satellite data centers, RF gateways and internet exchange points. The parameters that are examined to determine the most effective regionalized satellite network architecture may include handling failures at RF gateways, data centers and backhaul sites, cost effectiveness, resilience, flexibility, and bandwidth, among others. The resulting design may provide an optimized regionalized network architecture that takes into account the effects of rain fade in high frequency bandwidths. As a result, the technical solution provides an improved system and method of designing an interconnected satellite network.

As will be understood by persons of skill in the art upon reading this disclosure, benefits and advantages provided by such technical solutions can include, but are not limited to, a solution to the technical problem of optimally handling effects of rain in high throughput satellite systems that utilize higher frequency bandwidths. Technical solutions and implementations provided herein optimize and improve the design of satellite network systems. The benefits provided by these solutions include providing an interconnected satellite network system that reduces capital and operational expenditures by consolidating compute and network features at a regionalized data center, reduces gateway footprint, supports diversity and mobility features by maintaining internet protocol (IP) connectivity centrally, and optimally balances delay against costs.

FIG. 1 illustrates an example regionalized network architecture for a satellite system 100. The system 100 may include a plurality of terminals 110a to 110n, a number of regionalized RF gateways 120a to 120c, and one or more data centers 130a and 130b. The terminals 110 may communicate with the RF gateways 120 using a first layer-3 connection 112 that is established via a satellite 114. In one implementation, the satellite 114 may be a VHTS. The terminals 110 can be located at various customer locations in order to provide access for different client devices 116 to transmit/receive information to/from the RF gateways 120. The client devices 116 may include various computing devices which can be used by a consumer to communicate and/or access external networks. For example, such client devices 116 may include computers, laptops, tablets, mobile phones, or any network-enabled device having a wired and/or wireless interface.

Depending on the specific geographic location of each terminal 110, satellite communication may be established between the terminal and the satellite 114 with the use of an RF gateway 120 which is positioned to service a satellite beam encompassing the location of the terminal 110. Each gateway 120 may correspond to a site in a geographic location defined by the satellite. In an example, each gateway 120 may support multiple antennas, transmitters and/or cabling to hardware components such as baseband equipment that can be used to control the transmitters and process the information received and transmitted.

In one implementation, each gateway 120 may include one or more computing systems 124 capable of interfacing with appropriate hardware to establish a link to a radio frequency transmitter 126. It should be noted that while FIG. 1 depicts a single computing system 124 within the RF gateways 120, multiple computing systems can be utilized. The computing systems 124 may include servers, desktop computers, laptops, and the like which can be used to control different operations and devices associated with the gateway 120. When using higher band frequencies such as Q-bands and V-bands, one or more of the RF gateways 120 may be diverse RF gateways. Such RF gateway diversity may enable RF gateway switching that may be necessitated because of the effects of rain fades in the high frequency bands.

In one implementation, each RF gateway 120 is connected to a data center 130 via a connection 122. In an example, the connection 122 is a layer-3 connection which is established over a backhaul network 128 to reach the location of the data center 130. The data centers 130 may be regionalized by being located in various geographic areas, as needed to provide access to various external networks 140. The external networks 140 can include public networks (e.g., the internet) or private networks. Each data center 130 may include, for example, one or more computing systems 132 (e.g., desktop computers, laptops, servers, etc.) and a SNC 134. Alternatively, the SNCs 134 may be located at geographical locations that are different than the data centers 130. Furthermore, the backhaul network 128 may be used for RF gateway to RF gateway traffic, SNC to SNC traffic, and SNC to external network traffic. By using SNCs 130 which are regionalized, functions of a traditional gateway may be distributed between the RF gateways 120 and the SNCs 130. The system 100 may also include an external network management system (NMS) 150. The NMS 150 may be responsible for managing all aspects of terminals within the system.

In one implementation, the RF gateways 120 are geographically separated to minimize interference between them. The SNCs, on the other hand, may be located at sites that are geographically selected to balance the distances between the RF gateway locations and their public Internet connections. In this manner, system 100 may provide regionalized SNCs that enable optimal balancing by utilizing an optimal number of SNCs. This may lead to decreasing delays in the system, while keeping the cost of additional SNCs, RF gateways and diverse RF gateways in check. As a result, the system 100 may be considered a regionalized system as opposed to a centralized system with a single centralized SNC. This is because to optimally provide a centralized SNC system, the SNC would need to be located in the middle of the RF gateways in order to keep delay acceptable and do not require SNC redundancy. However, placing a SNC at a single centralized location may not be feasible because of the long backhaul delays introduced and the concentration of backhaul capacity required for linking from all RF gateways. As a result, a regionalized system is used instead.

It should be noted that, while regionalized, the system 100 may not be considered a distributed system with completely distributed SNCs at each RF gateway 120. That is because having such a distributed system may not be feasible in the presence of RF gateway diversity, which may be needed since higher frequency bands are utilized. A regionalized SNC architecture addresses all of these challenges. It should be noted that although, the SNCs 134 are depicted as being located at the data centers 130, each SNC 130 may be located at the same location or site as a corresponding RF gateway 120.

According to various implementations, the data centers 130 may function as a connection point for the terminals 110 to access the external networks 140. The system 100 may also include one or more network management systems 134 which may be located at a central network operations center from which network monitoring and control is exercised. In one implementation, each SNC 134 and RF gateway 120 is managed remotely in a lights-out fashion from the central network operations center. In an example, the network management system 150 is capable of communicating with all data centers 130 within the system 100. The data centers 130 can centrally perform operations that are performed at each individual gateway 120. In one implementation, the regionalized network architecture of system 100 addresses the challenges presented when using higher frequency bands.

Figure 2:
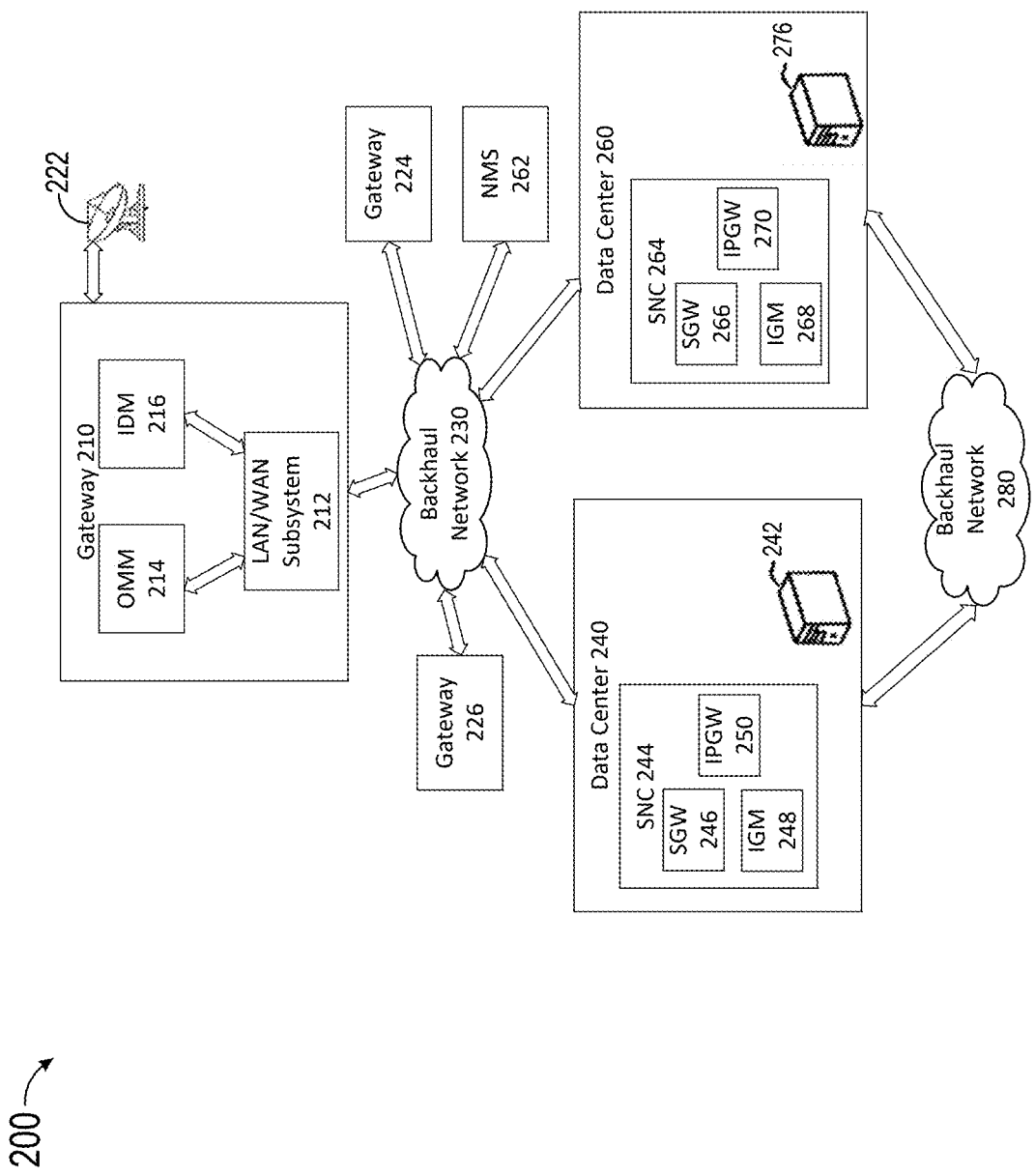
FIG. 2 depicts a diagram illustrating some of the end to end details of an example regionalized network architecture upon which aspects of this disclosure may be implemented.

FIG. 2 depicts a diagram illustrating some of the end to end details of an example regionalized network architecture 200 upon which aspects of this disclosure may be implemented. The regionalized network architecture 200 may include multiple RF gateways such as, gateway 210, gateway 224, and gateway 226, and a plurality of data centers such as data center 240 and data center 260. To compensate for rainfall in the higher frequency bands and provide elevated availability when utilizing high throughput spectrum, the gateways may be partitioned into RF gateways and SNC sites. The partitioned and regionalized architecture may provide optimized handling of diverse RF gateways in the presence of for rain fade in high frequency bands and may support quick switchover. As is known in the art, switchover may refer to the process of switching-in, which itself may be defined as the transition phase of switching between one RF gateway to another RF gateway. The process may involve a primary RF gateway and a diverse RF gateway. The diverse RF gateway may be switching-in for the primary RF gateway to become the switched-in RF gateway or it may be a primary RF gateway that is switching back in for itself.

The regionalized architecture may address the need for having a large number of dry locations available for RF gateways which may need to be selected from a small number of locations that provide good internet access. Furthermore, the regionalized architecture may reduce the number of require internet points of presence (POPs).

In the regionalized network architecture 200, the RF gateways may be geographically separated to minimize interference between them. The SNC sites may be regionalized and geographically located at various data centers (e.g., data centers 240 and 260) to balance the distances between the RF GW locations and their public internet connections. This may optimize the process of reestablishing states during a switchover of RF paths. This is because a large amount of state is often maintained for a given terminal and the need to reestablish that state can be the longest element of a switchover of RF path. For example, states may be maintained for inroute bandwidth allocation, timing, power, transmission control protocol (TCP), compression, web acceleration and other application and service states. In an example, the regionalized architecture allows the system to retain the inroute bandwidth allocation state across a switchover from an RF gateway to a diverse RF gateway. In another example, the state of the network system at the link and network layers is contained at the SNC locations. In one implementation, satellite network architecture 200 is grouped into one or more regions to optimize latency during switchover of one of the RF gateways.

Together the gateways and the data centers may provide customer terminals access to external networks 280. In one implementation, the gateway 210 includes a network subsystem, such as LAN/WAN subsystem 212 that is configured to provide connectivity to local (e.g., within the first gateway) and distant networks (e.g., outside the first gateway). For example, the LAN/WAN subsystem 212 can include multiple ethernet, optical, coaxial, and wireless interfaces which facilitate connectivity to local network devices, as well as external connectivity to a backhaul network 230 over a layer-3 connection.

In one implementation, the gateway 210 includes an outroute modulator module (OMM) 214 and an inroute demodulator module (IDM) 216 which may provide outroute and inroute subsystem operations. In one implementation, the radio frequency terminal (RFT) and the RFT antenna may also be located at the RF gateway locations. However, in contrast to existing distributed network systems, some operations that are traditionally performed by a gateway may be done by the SNCs in system 200. For example, one or more servers in the SNC 244 and/or SNC 264 may host an outroute processor (ORP), an inroute processor (IRP) and/or internet protocol gateway (IPGW) 250 and 270 functions. IPGWs. The IPGWs may perform functions such as TCP acceleration, header compression, payload compression, and the like and as such may include specialized hardware components configured to automatically perform such functions.

In one implementation, the IPGWs 250 and 270 of the SNCs may interface with the outroute and inroute subsystems of the RF gateways. The IPGW may be configured to manage the paths assigned to terminals for transmitting and receiving information. In this manner, the state of the system at the link and network layers may be contained in the set of SNC locations that are regionalized such as located at various data centers. As a result, inroute group managers (IGMs) 248 and 268 and satellite gateways (SGWs) 246 and 266 may be located at the SNC 244 and 264, respectively. The remaining transmission layer, however, may be located at the RF Gateway locations (e.g., gateways 210, 224 and 226) which may also contain one or more modems including the OMM 214 and IDM 216.

In an example, the gateways 224 and 226 are configured in substantially the same manner illustrated as the first gateway 210. It should be noted, however, that additional gateways can also be provided depending on the specific system implementation and requirements. Accordingly, the use of three gateways is only intended to be illustrative, and not restrictive. As discussed further below, one or more mechanisms may be used to determine the optimal number of SNCs and data centers to use in a system.

In one implementation, the data centers 240 and 260 may each include a CPU 242 and CPU 276, respectively, which can be programmed (or configured) to control various operations of the data centers 240 and 260. Alternatively, multiple servers, desktop computers, laptops, and the like may be used alone, or in combination, for controlling various operations of the data centers 240 and 260.

The system 200 may also include an external NMS 262 which is provided at a separate location from any of the first and second data centers 240 and 260. The NMS 262 may be responsible for managing all aspects of terminals within the system. In an example, the NMS 262 may connect to all the data centers within the system and manage network layer components in the data centers. The NMS 262 may also be able to connect to one or more gateways (210, 224, 226) and manage some components located within the gateways. For example, the NMS 262 may be responsible for managing certain aspects of terminals through their associated gateways. The NMS 262 can be configured to perform one or more management functions and supply load balancing and redundancy information to the individual data centers. Thus, if one data center becomes inoperable, the external NMS 262 may provide information to the operational data centers for redistributing and rebalancing traffic within the system. The NMS may be located at a network operations center. In an alternative implementation, one or more network management systems may be located at one or more data centers.

It should be noted that although, system 200 illustrates a system that only includes two data centers, various implementations can incorporate additional data centers, as necessary, to optimize costs and speed of the system. Under such configurations, if one data center becomes inoperable, then management of the terminals, gateways, and traffic may be redistributed and rebalanced among the operable terminals. For example, if the system includes six data centers, management of terminals, gateways, and traffic is initially distributed and balanced among all six data centers. If the first data center becomes inoperable, then such functions would be redistributed and rebalanced between the second, third, fourth, fifth, and sixth data centers. If the second data center also becomes inoperable, then the functions would be redistributed and rebalanced among third, fourth, fifth, and sixth data centers. Thus the satellite network system can provide dynamic changes in network topology due to use of a backup RF gateway from one of the SNCs, failure of one or more SNCs or failure of a backhaul link.

In order to provide an optimized regionalized architecture that distributes a number of RF gateways and SNCs to improve various parameters and distributes traffic between data centers and RF gateways in a manner that decreases downtime during switchover events (e.g., due to rain), the technical solution may utilize a mechanism for designing an improved terrestrial backhaul network. The improved backhaul network may be designed in a manner that optimizes connectivity between data centers, gateways, and internet exchange points and handles throughput and availability requirements under both normal and failure operating conditions. Table 1 illustrates some of the connectivity requirements for such a system. In table 1, Y denotes instances when connectivity is required, and N denotes when connectivity is not required.

TABLE 1

| | RF Gateway | SNC (Data Center) | Internet Exchange Points | Customer Meet-Me Point | Management |
|---|---|---|---|---|---|
| RF Gateway | N | Y | N | N | Y |
| SNC (Data Center) | Y | Y | Y | Y | Y |
| Internet Exchange Points | N | Y | N | Y | Y |
| Customer Meet-Me Point | N | Y | Y | N | N |
| Management | Y | Y | Y | N | N |

In one implementation, the improved backhaul network enables RF gateways to send and receive layer 2 traffic (e.g., bursts, codeblocks, etc.) as IP traffic to and from SNCs. In this manner, information that needs to travel from a primary to a diverse RF gateway may be passed via an SNC. As such, when a diversity RF gateway is in use, the improved backhaul may transfer all traffic to/from the primary RF gateway and its SNC between the SNC and the diversity RF gateway. Some of the other considerations that may need to be taken into account in designing the backhaul network include determining how user traffic from an SNC is transmitted, where customer meet-me points are to be located, and how to enable control traffic to travel from one SNC to another SNC, from an SNC to an internet exchange point and from an SNC to an RF gateway. In an example, user traffic to and from an SNC travels via an internet exchange point. However, in some cases (e.g., centralized network address translation for IP version 4), SNC to SNC traffic may need to be carried. In one implementation, customer meet-me points are located at internet exchange points. Alternatively, customer meet-me points may be located at SNCs.

In one implementation, the improved backhaul design may need to deploy control plane functions such as software-defined networking (SDN) controllers at one or more SNCs. Furthermore, the improved designed may need to ensure traffic from a centralized management system can reach all SNCs, RF gateways and internet exchange points. Additional considerations to take into account may include a network's ability to leverage carrier-based wavelength services, link speeds from carriers for wavelength services and costs associated with various wavelengths (e.g., costs associated with 100 G wavelengths may be significantly more that costs associated with 10 G wavelengths).

To provide a backhaul network design that takes the above considerations into account and provides a balanced approach between low fiber miles, low latency, carrier redundancy and diversity at SNC locations, a number of design choices may be made. For example, the improved backhaul network may limit the path distance across the network in an effort to reduce cost and latency. Moreover, the improved backhaul network may leverage use of internet exchange points and large carrier data centers at SNC locations. Furthermore, the network may be designed such that traffic is routed from RF gateways to the closest SNC locations. In an example, the improved backhaul network may prioritize use of low-cost facilities for SNC and/or traffic processing centers. In another example, SNC and/or traffic processing centers may be selected such that they have close proximity to one or more internet exchange points and have fiber access to multiple service providers. This may reduce fiber mile and provider diversity which may lead to reduced costs. In one implementation, the improved backhaul network may utilize an inter-ring backbone to interconnect major gateways and hubs together. Furthermore, the improved network may be designed such that it provides support for existing networks, handles all traffic types (e.g., is able to support any satellite transport to any gateway) and has bandwidth capacity to handle steady state as well as failure conditions (e.g., conditions such as fiber cut, SNC failure, and the like).

To determine the best network topology for the backhaul network, the technical solution may examine various network topologies and identify which ones most closely take into account the considerations discussed above. In one implementation, this may involve examining multi-hub and spoke (MHS), star and ring topologies. In an MHS topology, remote gateway nodes may be connected to two or more backbone nodes (e.g., hubs), and traffic processing centers may be located on backbone nodes. As a result, some backbone nodes may need more fiber connections to remote gateway nodes due to their location and their need to access internet exchange points. Thus, the amount of fiber miles and the distances needed to connect a remote node to a backbone node may be higher than some of the other topologies.

A star topology may refer to a network that provides fully connected point-to-point links. These may include links between the primary SNC and the primary RF gateway, redundant SNC links for every RF gateway, and links to each diverse RF gateway link from each SNC. As a result, a star topology may provide improved delay performance. However, because of the extensive links between various points, the star topology may also result in a very costly design.

The ring topology may position multiple remote gateways on a ring, while locating traffic processing centers on backbone nodes. In one implementation, a remote gateway node in a ring topology may have multiple connections (e.g., two 100 G connections), with one connection to a backbone node and one connection to another remote gateway node. This may provide redundancy at a decreased cost. This is because compared to MHS and star topologies, the ring includes a lower number of links which results in minimizing cost. In an example, in the ring topology, each ring may connect to the closet backbone node. As a result, the ring topology can distribute traffic and loads across the backbone nodes which may lead to increased efficiency. Moreover, the ring topology may utilize more larger capacity wavelengths (e.g., 100 G wavelengths) to increase efficiency as more than one remote gateway node is on a ring. However, use of the ring topology may result in a ring outage in some double failure outage scenarios. For example, a link failure between two nodes and an equipment failure at another node on the same ring can result in the failure of more than one remote gateway being serviced by the ring. Moreover, the ring topology may result in increased delays as compared to MHS and star topologies.

Figure 3:
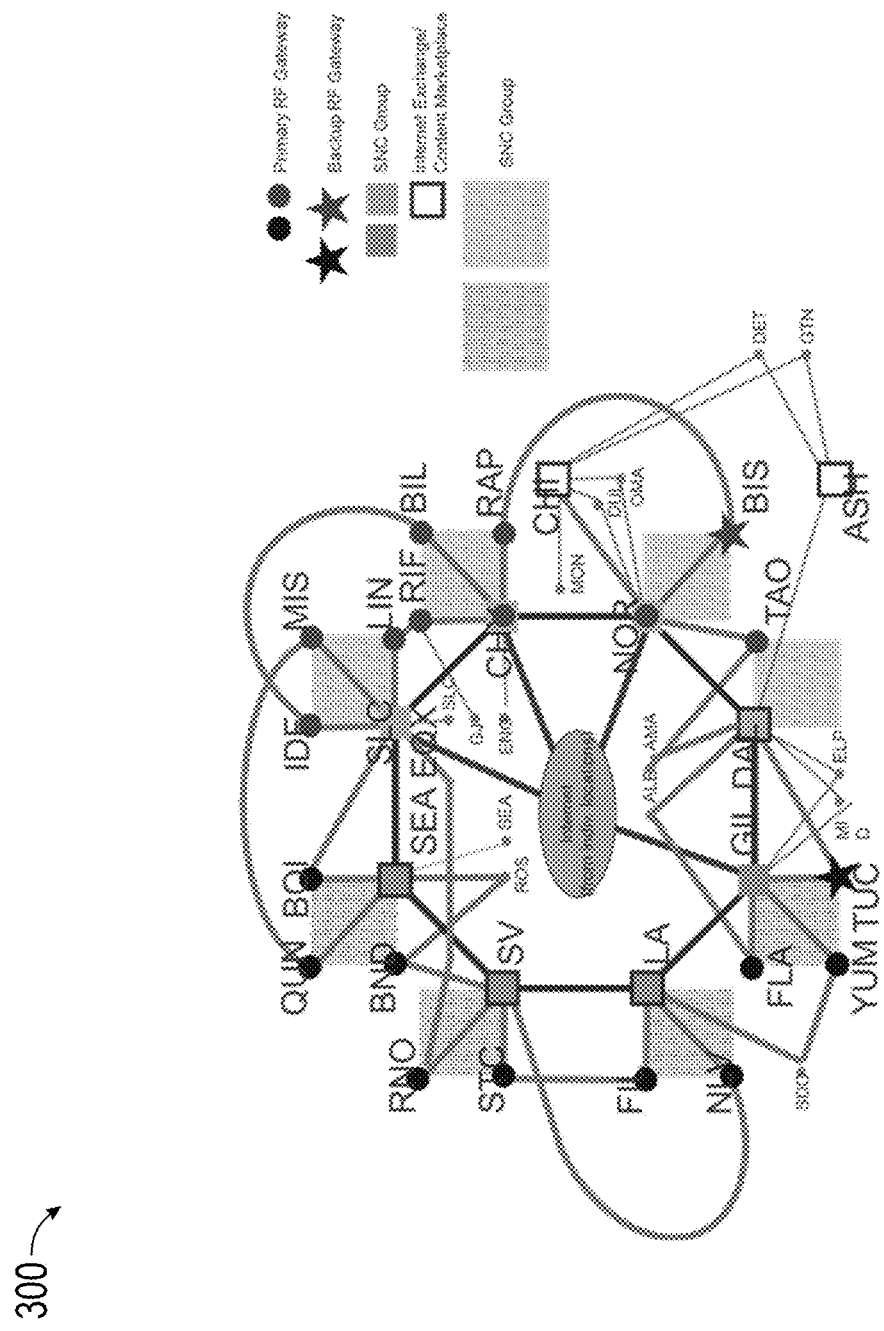
FIG. 3 depicts an example backhaul network rings map upon which aspects of this disclosure may be implemented.

In one implementation, taking all of the above considerations into account, a ring topology is selected for the backhaul network design. FIG. 3 depicts an example backhaul network rings map 300 upon which aspects of this disclosure may be implemented. In the example rings map 300, circles depict primary RF gateways, while stars depict diverse RF gateways. Furthermore, gray colored small squares depict SNCs, white small squares depict internet exchange points, and large colored squares depict SNC groups. In the illustrated design, each RF gateway connects to a local SNC. Furthermore, the ring network is designed such that a second path exists for all gateways. The central core ring may carry the traffic to/from the diverse RF gateways, SNC to SNC traffic and some SNC to internet exchange points traffic. The diverse RF gateways may be grouped together, as shown, to reduce traffic and latency when the primary RF gateway needs to utilize a diverse RF gateway. In one implementation, each RF gateway may be associated with one group of diverse RF gateways. However, under certain conditions, it may be possible for a diverse RF gateway group to provide backup to an RF gateway from another diversity group (group of diverse RF gateways). In one implementation, the backhaul network comprises of a main ring design for connecting the SNCs and a tail ring design for connecting one or more of the RF gateways to one or more of the SNCs.

Figure 4:
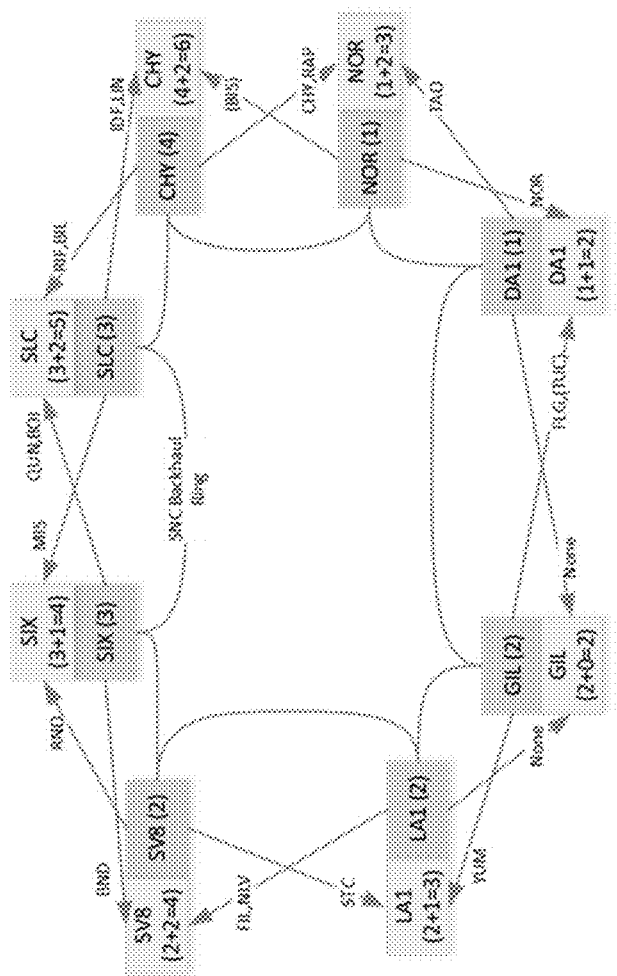
FIG. 4 depicts an example satellite network core (SNC) redundancy map for various SNCs in a ring backhaul network.

In an implementation, use of a ring backhaul topology provides efficient SNC redundancy for a primary SNC. FIG. 4 depicts an example SNC redundancy map 400 for various SNCs in a ring backhaul network. In the SNC redundancy map 400, each redundant SNC is located adjacent to the primary SNC on the SNC ring. In this manner, upon an SNC failure, traffic may be carried by a neighbor SNC. As a result, the RF gateways previously serviced by the failing SNC may be distributed to multiple SNCs as a function of regional ring connectivity. This may reduce central core backbone ring usage when operating under an SNC failure. In the SNC redundancy map 400, the number in the parenthesis after each primary SNC may indicate the number of RF gateways serviced by that primary SNC. For example, primary SNC 1 services one RF gateway. The number in the parenthesis after each redundant SNC, on the other hand, may indicate the maximum number of RF gateways serviced by that redundant SNC. Thus, redundant SNC 1 may service a maximum number of three RF gateways.

In order to provide an optimized regionalized architecture that distributes a number of RF gateways and SNCs to improve various parameters such as bandwidth reuse, satellite construction, fiber availability, and link availability, the technical solution may utilize a mechanism for determining the optimal number of SNCs and/or data centers to use in the system. This may involve studying various parameters that affect the system's operations to determine which number of SNCs provide the best results. The driving factors for determining the optimal number of SNCs may include satellite cost verses complexity and availability of redundant paths, backhaul link cost and distance, backhaul link quality of service (e.g., delay, jitter, etc.), existing fiber for backhaul (e.g., possibility of sharing with existing networks), and SNC equipment and facility costs. In an example, the parameters that are examined may include reviewing SNC backhaul concentration, backhaul delay and costs associated with different numbers of SNCs.

Figure 5:
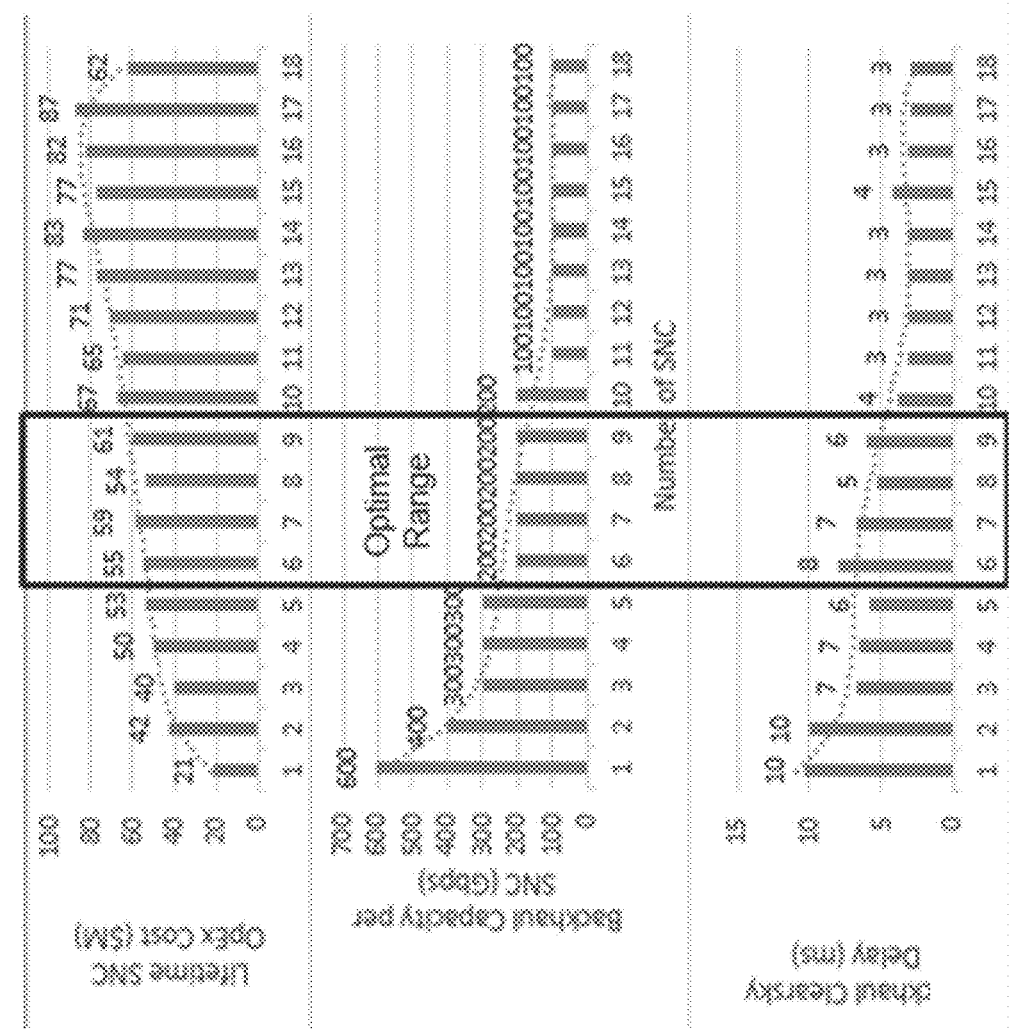
FIG. 5 depicts various example charts for examining how different parameters change as the number of SNCs used in a system increases.

FIG. 5 depicts various example charts for examining how different parameters change as the number of SNCs used in a system increases. The parameters include lifetime operational costs for the SNCs in the system, backhaul capacity per SNC and backhaul clear sky delay. To determine total lifetime operational costs for the system, a per-SNC equipment cost may first be calculated. This may involve determining the total amount of capital expenditure and operational expenditures for each SNC. The capital expenditure may include hardware equipment costs and initial software licensing costs. In an example, the hardware equipment cost may include the costs of a starter rack, control node, network node, storage node, computer node, expansion rack, license costs for services (e.g., CGNAT), and compute/storage/network infrastructure management (e.g., open-stack). The SNC operational costs may include maintenance and subscription licenses. To accurately take cost into account, the technical solution may make use of mechanisms for estimating future costs based on previous costs and trends to calculate estimated costs associated with different numbers of SNCs.

Another parameter that may be examined carefully in determining an optimal number of SNCs is SNC backhaul concentration. The SNC backhaul concentration may be calculated as the sum of bandwidths for all RF gateways that the SNC must potentially service. This may include bandwidths after failure of a neighboring SNC. As depicted in the charts 500 of FIG. 5, the lower the number of SNCs in the network, the higher the SNC backhaul concentration is. For example, having 3 or less SNCs leads to the SNC backhaul concentration being more than 300 Gbps per SNC. The high SNC backhaul concentration may lead to circuit sizes that are either too expensive or not possible to procure from a single site. Furthermore, the high SNC backhaul concentration may make the network more susceptible to a single failure. As a result, a single failure may impact too large a percentage of the total network bandwidth. Moreover, the more RF gateways an SNC services, the more the network may be affected if there is an SNC outage.

To select the optimal number of SNCs for a network, the amount of potential delay may also be carefully analyzed for various SNC numbers. In one implementation, the technical solution may calculate the amount of SNC-RF gateway delay under clear sky and rain fade conditions for different numbers of SNCs. In one implementation, during normal mode (when there is no failure), traffic may be routed to the primary RF gateway with a normal or decreased delay (e.g., less than 10 ms) when the sky is clear. However, during normal mode (when there is no failure) but there is rain fade, traffic may be routed to the diverse RF gateway. In an example, it was shown that under clear sky conditions (e.g., no failure), delay is generally decreased (with some outliers, for example, at the 4, 6 and 9 SNCs) as the number of SNCs increases. until it becomes steady. Under rain fade conditions, however, delay varies between numbers of SNCs, but seems to be the lowest for one to five SNCs. To take various conditions into account, delay may also be estimated and studied in various failure conditions. For example, delay may be calculated for different numbers of SNCs, when one link fails both during clear sky and during rain fade. Similarly, delay may be calculated for different numbers of SNCs, when one node fails, when one SNC fails and one direct connect gateway (DGW) fails. In one implementation, the various delay conditions are compared to determine if there is overlapping decreased delay for a certain number of SNCs. However, if there is a wide delay variance for different conditions, the technical solution may focus on clear sky backhaul delay for determining the optimal number of SNCs.

In one implementation, a decision may be made to focus on cost and reliability as well as delay for determining the optimal number of SNCs. In one implementation, the study of various parameters may lead to selecting 8 SNCs for an example network. This may be based on the fact that 8 falls in the optimal range of all the variables examined in the charts 500 of FIG. 5, among other factors.

When utilizing a regionalized network for a VHTS, bandwidth allocation mechanisms may have to be modified to address some of the challenges raised with the use of a VHTS. In a shared bandwidth system, bandwidth may get allocated to terminals that access the return channels for a frame in the future. The delay between when the system should calculate that bandwidth allocation and the actual time at which terminals utilize that bandwidth may be referred to as bandwidth lookahead. Bandwidth lookahead may be a function of the time it takes the bandwidth manager to complete the allocations for its channels in a given frame (including building the bandwidth assignment packets, which may include processing time) and the amount of time required for sending the bandwidth packets. The amount of time required for sending the bandwidth packets may be a sum total of the amount of time it takes the bandwidth manager to send the packets, the time it takes for the packets to be received at all the outroute senders, the time it takes for the packets to be broadcast/multicast from relevant outroute senders, the time it takes for the packets to be received over the satellite at the longest slant path for the terminal furthest in the shared beam, and the time it takes for the packets to be processed by the terminal in time to determine and schedule its transmissions.

In one implementation, in order to properly account for bandwidth lookahead, the transmission times may be divided into frames having specific sizes (e.g., 45 ms). In this manner, bandwidth may be assigned, allocations may be transmitted, and terminals may schedule for a given frame N in the future. The longer the bandwidth lookahead time, the more latency there may be in how fast the bandwidth manager can react to the terminal requesting more bandwidth, which may lead to data latency. Furthermore, a longer bandwidth look a head time may also affect how fast the bandwidth manager can react to changes such as the terminal no longer needing bandwidth, which may lead to inefficiencies. Currently used mechanisms for calculating bandwidth lookahead often use the worst-case denominator for the bandwidth lookahead. Because the variance in the latency for prior network designs was not very large (i.e., the variance is small relative to the 45 ms frame time), use of this worst-case denominator did not unduly increase the latency.

With the VHTS design, however, there may be additional variance. The additional variance may include variance from a) additional terrestrial delay between an SNC and an RF gateway, b) changes to the terrestrial delay when the SNC switches from a primary to a diverse RF gateway and back, c) changes to the terrestrial delay when an SNC fails and traffic is serviced by an SNC in a different geographical region, d) changes to the terrestrial delay due to needing to take a new terrestrial path (e.g., fiber cut leading to a new path around the ring), and e) changes to the terrestrial delay due to significant changes in congestion on one or more links. As a result, using the worst-case denominator would significantly increase the bandwidth lookahead time and could add undesirable latency and/or inefficiency to accommodate changes in latency that occur only a small percentage of the time.

To address these technical problems and more, in an implementation, the technical solution utilizes an improved method of calculating bandwidth lookahead. The improved method may involve measuring delay in an optimized manner and then using the delay to calculate the bandwidth lookahead. This may be achieved by creating bandwidth allocation packets at the SNCs by for example using the IGMs and then routing the packets via code rate organizers (CROs) to the OMMs at the RF gateways. Multiple IGMs may exist in the same beam operating on different parts of the spectrum. In an example, each of the IGMs should uses the same bandwidth lookahead. There may a variety of options for sending delay measurement packets in the system. One possibility is to send the delay measurement packets from the IGM on the same path as the bandwidth allocation. Another possibility may be to assume that traffic delay from the IGMs to the CROs is minimal and as such send the delay measurement packets directly from the CROs. A third option may be to transmit the delay measurement packets from an entity other than the IGM to the CRO.

In calculating delay, some of the factors that may need to be into account include the fact that packets of different priorities between an SNC and RF gateway may be subject to different delays. Thus, the delay measurement packets should have the same priority as the CRO uses for the IGM bandwidth allocation packets across the backhaul. In one implementation, the backhaul network uses segment routing, which is a source routing method. As a result, changing the system ID (SID) list that defines the source route may change the path of the packet and, thus, change the delay. To address that, in an example, irrespective of the entity which sources the packets, the entity uses the same SID list that the CRO uses for the bandwidth allocation packets. It should also be noted that the codeblock packets carrying the bandwidth allocation packets may be large. Delay measurement packets, on the other hand, are usually small. In an implementation, care is taken to assure the difference in packet size does not impact the measurement itself. Moreover, because the bandwidth lookahead may be small (e.g., 45 ms), the design does not react to small changes in delay.

In one implementation, instead of measuring delay between all potential paths, it may only be measured for the more likely paths. These may include the path from the primary SNC to the primary RF gateway and the path from the primary SNC to the preferred diverse RF gateway. In turn, the paths from the backup SNC to the primary RF gateway and the back SNC to the preferred diverse RF gateway may be measured only when failed over to the backup SNC.

In one implementation, after one-way delay (assuming synchronization between the SNC and RFT), jitter and packet loss rates are measured, delay calculations may be made. This may include calculating a running average for the one-way delay. The running average may then be used to determine the bandwidth lookahead. In one implementation, lookahead frames may be calculated based on satellite lookahead frames plus terrestrial lookahead frames, where terrestrial lookahead frames are between zero and five. The determinations may be made according to the following logic:

In one implementation, the network delay may need to be changed based on changing one of RF gateways, a ring failure in the backhaul network, or traffic engineering changes in the backhaul network.

Given that an RF gateway can switch to a diverse RF gateway and an RF gateway can be moved to another SNC, synchronization may be needed among the RF gateways and SNCs such that they have the same timing reference. In an implementation, point to point protocol (PTP) may be utilized to distributed timing among various RF gateways and SNCs. Furthermore, an algorithm may be used to ensure that all modulators and demodulators across RF gateways have the same concept of super frame.

Figure 6:
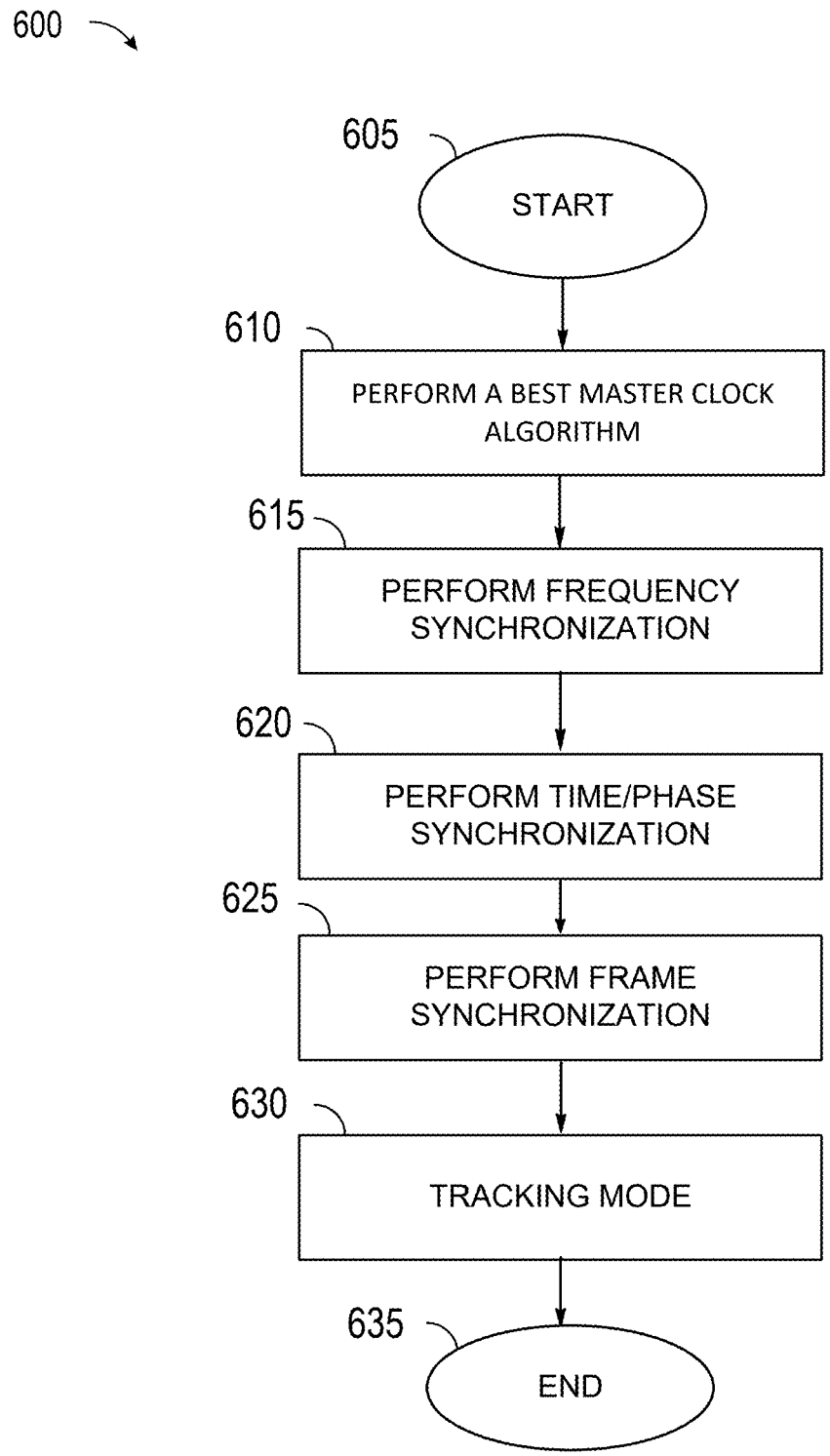
FIG. 6 is a flow diagram depicting an example method for synchronizing the elements of satellite network system.

FIG. 6 is a flow diagram depicting an example method 600 for synchronizing the elements of satellite network system. At 605, method 600 may begin and move to step 610 to perform a best master clock algorithm (BMCA), as is known in the art. Method 600 may then proceed to perform frequency synchronization, at 615, before performing time/phase synchronization, at 620. In one implementation, frequency synchronization is done by locking a modem to the PTP master clock. Time/Phase synchronization may be done by synchronization one or more modems with the master (GPS). After time/phase synchronization has been achieved, method 600 may proceed to perform frame synchronization at 625 by locking the super frame number and generation to the network. Method 600 may then proceed to a tracking mode, at 630, where it tracks frequency, time, frame, and grand master clock during normal operations, before ending, at 635.

Figure 7:
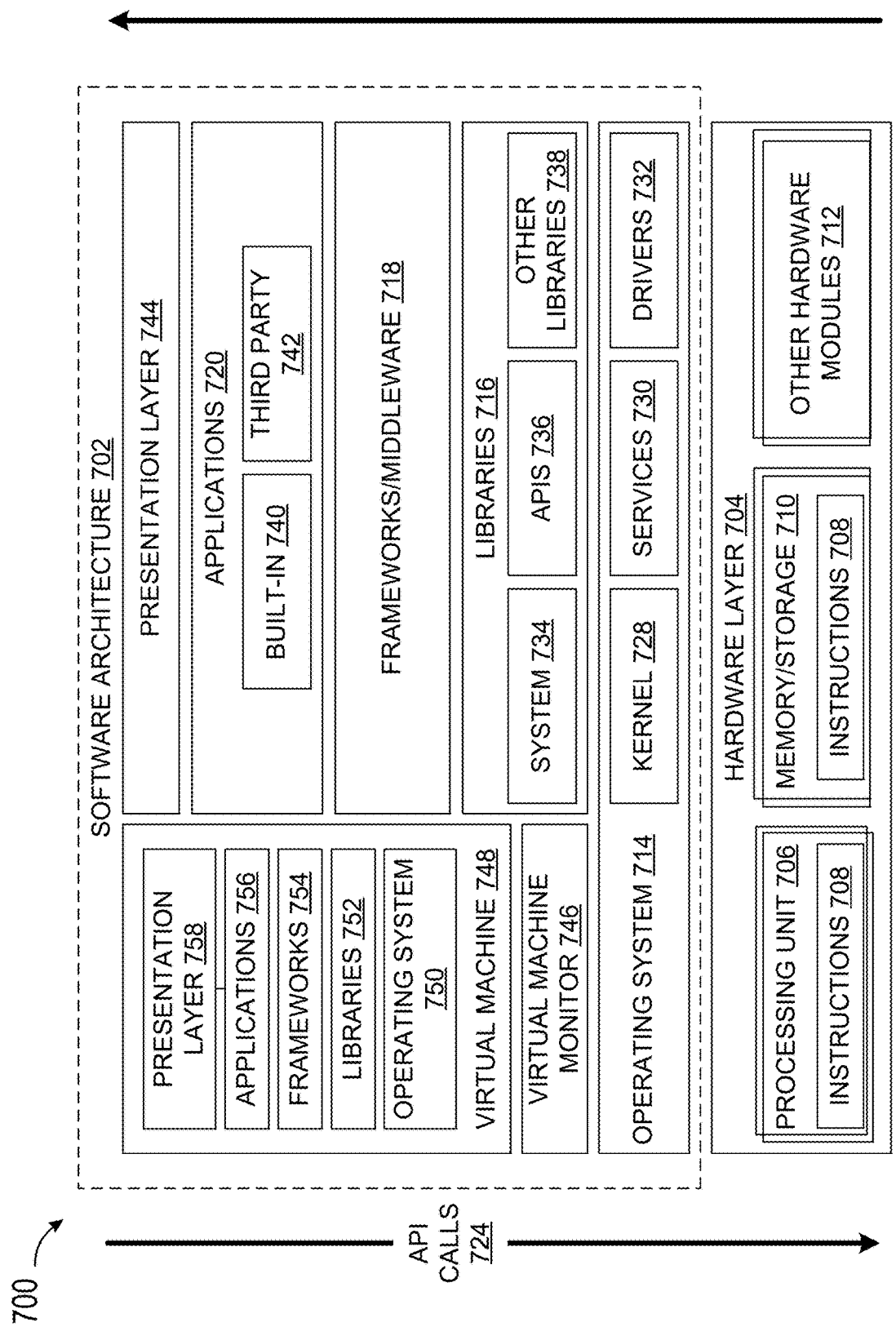
FIG. 7 is a block diagram illustrating an example software architecture, various portions of which may be used in conjunction with various hardware architectures herein described.

FIG. 7 is a block diagram 700 illustrating an example software architecture 702, various portions of which may be

```
If ((Average_Delayrunning+N*StandardDeviation_Jitter) - 45ms*
Terrestrial_Lookhead_Frames) >= 0,
        If ((Average_Delayrunning + N* StandardDeviation_Jitter) - 45ms*
    Terrestrial_Lookhead_Frames) > Up_Threshold,
        Terrestrial_Lookahead_Frames+=RoundUp(((Average_Delayrunning+N*StdDev_J
        itter) - 45ms* Terrestrial_Lookhead_Frames)/45ms,0)
    Else
        If Abs(((Average_Delayrunning + N*StdDev_Jitter) - 45ms*
Terrestrial_Lookhead_Frames)) > Down_Threshold,
        Terrestrial_Lookahead_Frame -= RoundDown(Abs(((Average_Delayrunning
    + N*StdDev_Jitter) - 45ms* Terrestrial_Lookhead_Frames))/45ms,0)
```

In the formulations, standard deviation and averaging may be used to ensure that a large percentage of samples are taken into account while large outliers are ignored. This is because there may be a large number of samples that are received and any actual value may be different than the average due to a number of reasons (e.g., jitter, anomalies, etc.). By using the above logic, it can be determined whether the increase or decrease in latency of the measured sample relative to the current lookahead and changes lookahead by some number of frames is a function of the change.

In one implementation, determining the bandwidth lookahead delay may involve measuring the delay from an active SNC to an active RF gateway along the same path that the actual bandwidth assignment packets traverse, actively measure the delay across other potential paths (e.g., from active to diverse and diverse to active), smooth the delay to ensure the changes to are not statistical anomalies, and calculate the bandwidth lookahead delay as a function of the active delay. After the bandwidth lookahead delay is calculated, it may be reported to the terminals. In one implementation, the process can handle changes to the bandwidth lookahead delay that go forward or backward in time.

used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as client devices, native application provider, web servers, server clusters, external services, and other servers. A representative hardware layer 704 includes a processing unit 706 and associated executable instructions 708. The executable instructions 708 represent executable instructions of the software architecture 702, including implementation of the methods, modules and so forth described herein.

The hardware layer 704 also includes a memory/storage 710, which also includes the executable instructions 708 and accompanying data. The hardware layer 704 may also include other hardware modules 712. Instructions 708 held by processing unit 708 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 724. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various GUI functions, high-level resource management, or high-level location services. The frameworks 718 may provide a broad spectrum of other APIs for applications 720 and/or other software modules.

The applications 720 include built-in applications 720 and/or third-party applications 722. Examples of built-in applications 720 may include, but are not limited to, a contacts application, a browser application, a location application, a media application, a messaging application, and/or a game application. Third-party applications 722 may include any applications developed by an entity other than the vendor of the particular system. The applications 720 may use functions available via OS 714, libraries 716, frameworks 718, and presentation layer 724 to create user interfaces to interact with users.

Some software architectures use virtual machines, as illustrated by a virtual machine 728. The virtual machine 728 provides an execution environment where applications/modules can execute as if they were executing on a hardware machine (such as the machine 800 of FIG. 8, for example). The virtual machine 728 may be hosted by a host OS (for example, OS 714) or hypervisor, and may have a virtual machine monitor 726 which manages operation of the virtual machine 728 and interoperation with the host operating system. A software architecture, which may be different from software architecture 702 outside of the virtual machine, executes within the virtual machine 728 such as an OS 750, libraries 752, frameworks 754, applications 756, and/or a presentation layer 758.

Figure 8:
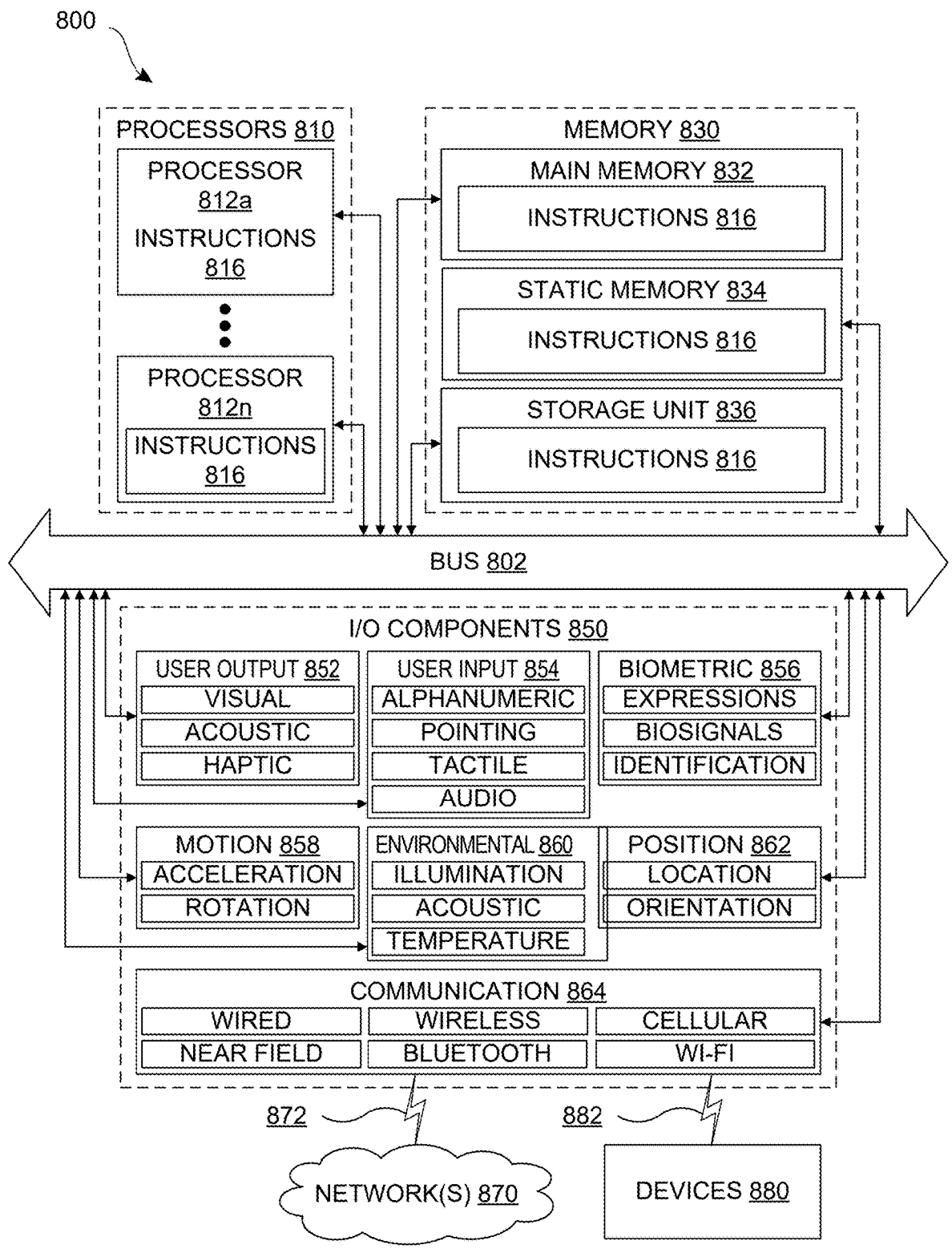
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement methods or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" include a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 916 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-10) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method for designing a satellite network comprising:
   selecting an optimal design for a backhaul network to be used as part of the satellite network;
   selecting a number of radio frequency (RF) gateways for the satellite network;
   selecting an optimal number of satellite network cores (SNCs) for the satellite network;
   placing each SNC at a site that is geographically separate from locations of the RF gateways;
   selecting a number of data centers for the satellite network;
   connecting each SNC to one or more data centers in the satellite network; and
   connecting each of the one or more data centers to one or more of the RF gateways via the backhaul network.

2. The method of claim 1, wherein the RF gateways are geographically separated to minimize interference between them.

3. The method of claim 1, wherein the SNCs are located at sites that are geographically selected to balance distances between RF gateway locations and their associated public Internet connections.

4. The method of claim 1, further comprising changing a network delay based on at least one of changing one of the plurality of RF gateways, a ring failure in the backhaul network, or traffic engineering changes in the backhaul network.

5. The method of claim 1, wherein the optimal number of SNCs is selected by taking into account costs of additional SNCs, delays in the system, and backhaul concentration.

6. The method of claim 1, wherein the optimal design for the backhaul network is one of a ring design or a star design.

7. The method of claim 1, wherein at least one of the SNCs include at least one of an outroute processor (ORP), an inroute processor (IRP), and one or more internet protocol gateway (IPGW) functions.

8. The method of claim 1, further comprising:
   measuring an active delay from an active SNC to an active RF gateway along a path that bandwidth assignment packets travel;
   calculating a bandwidth lookahead delay based at least in part on the active delay; and
   reporting the bandwidth lookahead delay to one or more terminal.

9. The method of claim 1, further comprising performing synchronizing among the RF gateways and SNCs such that the RF gateways and the SNCS have a same timing reference.

10. A regionalized satellite network system comprising:
    a backhaul network;
    a plurality of RF gateways;
    one or more satellite network cores (SNCs); and
    one or more data centers, wherein:
    each of the one or more SNCs is located at a site that is geographically separate from locations of each of the plurality of the RF gateways;
    each of the one or more SNCs is connected to at least one of the one or more data centers; and
    each of the one or more data centers is connected to one or more of the plurality of RF gateways via the backhaul network.

11. The regionalized satellite network system of claim 10, wherein the regionalized satellite network system is used with a very high throughput satellite (VHTS).

12. The regionalized satellite network system of claim 10, wherein the VHTS uses high frequency bandwidths.

13. The regionalized satellite network system of claim 10, wherein the regionalized satellite network system is configured to provide dynamic changes in network topology due to at least one of: use of a backup RF gateway from one of the one or more SNCs, failure of at least one of the one or more SNCs and failure of a backhaul link.

14. The regionalized satellite network system of claim 10, wherein each of the one or more SNCs is located at one of the one or more data centers.

15. The regionalized satellite network system of claim 10, wherein the backhaul network comprises of a main ring design for connecting the one or more SNCs and a tail ring design for connecting one or more of the plurality of RF gateways to one or more of the SNCs.

16. A satellite network system comprising:
a backhaul network having an optimal network design;
a plurality of RF gateways;
a selected number of satellite network cores (SNCs);
one or more data centers; and
an external network management system,
wherein:
    each of the SNCs is located at a one of the one or more data centers;
    each of the one or more data centers is connected to one or more of the plurality of RF gateways via the backhaul network, and
    the external network management system is connected to at least one of the one or more of data centers via an external network.

17. The satellite network system of claim 16, wherein the optimal network design for the backhaul network is a ring design.

18. The satellite network system of claim 17, wherein each of the SNCs is located at a site on the ring.

19. The satellite network system of claim 17, wherein the satellite network system provides SNC redundancy by placing a redundant SNC adjacent to a primary SNC on the ring.

20. The satellite network system of claim 16, wherein the satellite network system is grouped into one or more regions to optimize latency during switchover of one of the plurality of RF gateways.

* * * * *